Patented Sept. 25, 1928.

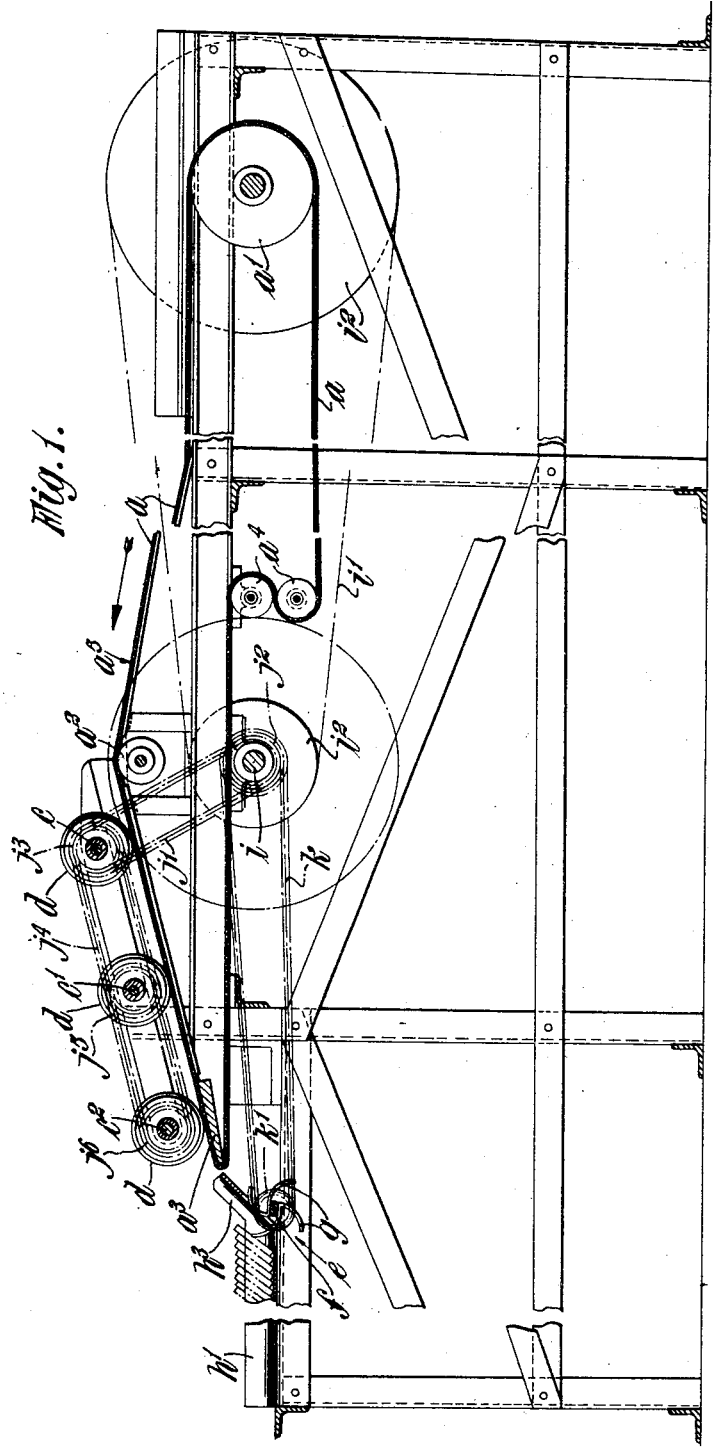

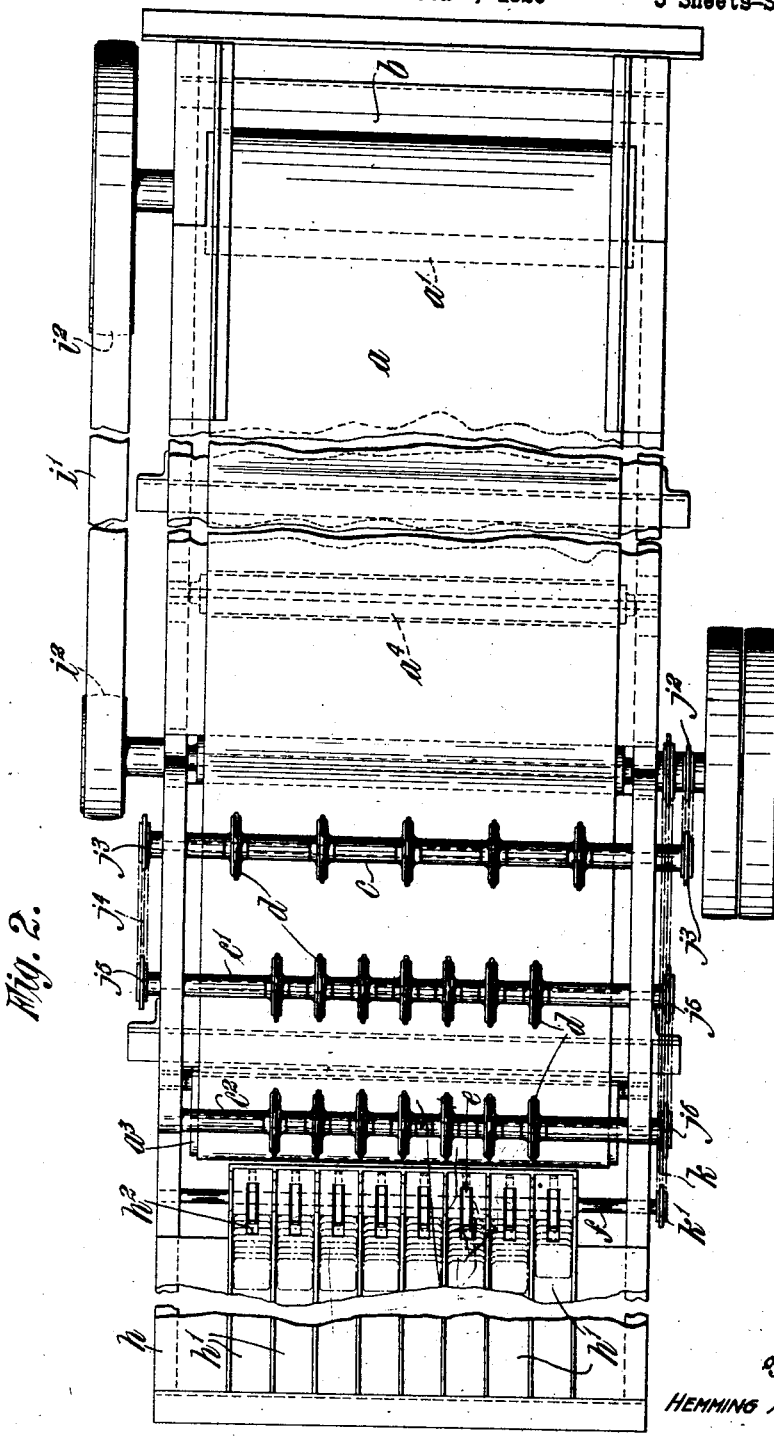

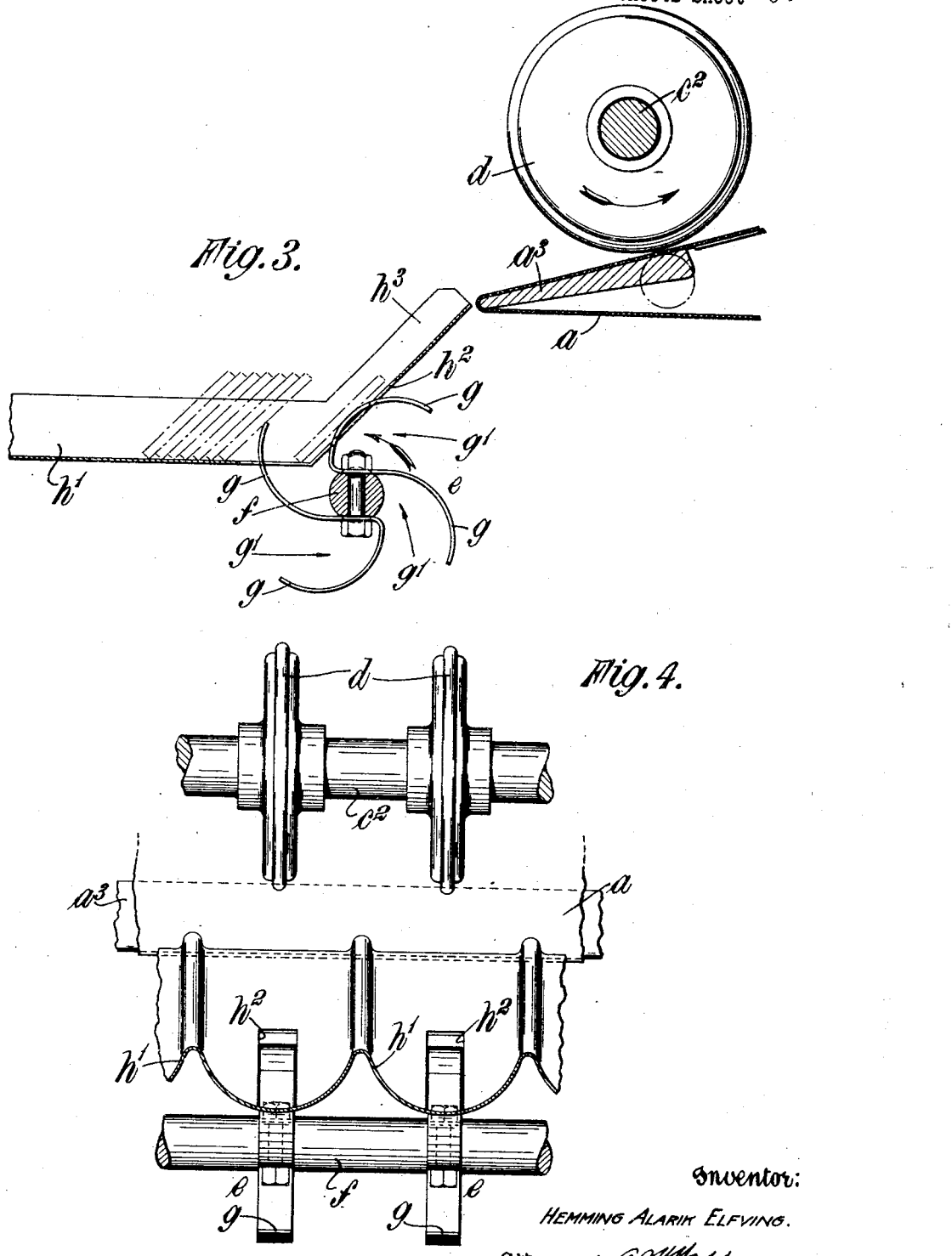

1,685,354

UNITED STATES PATENT OFFICE.

HEMMING ALARIK ELFVING, OF HANGO, FINLAND, ASSIGNOR TO FINSK-ENGELSKA BISCUIT-FABRIKS A. B., OF HANGO-VAXEL, FINLAND, A FINNISH COMPANY.

APPARATUS FOR STACKING BISCUITS AND SIMILAR ARTICLES.

Application filed March 9, 1926, Serial No. 93,617, and in Great Britain March 18, 1925.

This invention relates to apparatus for stacking biscuits and similar articles, that is to say, placing said biscuits or articles on edge in a position to be readily grasped or removed as for packing operations.

The invention comprises a movable conveyor adapted to receive the biscuits in haphazard or disarranged condition, with means cooperating with said conveyor for definitely arranging or spacing the biscuits into rows thereon and means for receiving the rows of biscuits from the conveyor and placing them successively on edge, in stacked formation.

The invention also comprises other details of construction, combination and arrangement of parts all as hereinafter fully described with reference to the accompanying drawings in which:—

Fig. 1 is a diagrammatic side elevation of the apparatus; Fig. 2 is a plan view thereof; Fig. 3 is a detail sectional view on an enlarged scale of the stacking device proper and associated parts, and Fig. 4 is a fragmentary end view from the left of Fig. 3.

The apparatus shown in said drawings comprises a suitable framing supporting a conveyor or band $a$, suitably of the endless variety, and shown as passing about rollers $a^1$ $a^2$, a knife edge $a^3$ and guide rollers $a^4$. The biscuits are emptied in a pell-mell or haphazard fashion on to said band $a$ from the trays or plates in or on which they are usually baked, there being conveniently provided at such emptying position one or more metal bars, rails or other abutments $b$ above the surface of the conveyor against which the trays or plates may be knocked by the operative to detach any biscuits which may have a tendency to stick thereto.

The preferred arrangement of the conveyor $a$ is as shown, that is to say, it is inclined upwards from the table at $a^5$ then about the roller $a^2$, thence downward about the knife edge $a^3$ and back to roller $a^1$.

Towards the delivery end of the conveyor and above same are provided a number of transverse spindles or shafts $c$, $c^1$, $c^2$, carrying thin discs or circular plates $d$ driven in a direction opposed to that of the travel of the conveyor $a$ and lightly contacting with or offering very small clearance to its surface.

There may, for example, be provided as shown three of such series of discs the purpose of which is to arrange the biscuits, emptied in disorder on to the conveyor, in properly spaced rows. This is effected in stages by mounting the discs $d$ of the first series at distances apart greater than the diameter or dimensions of the biscuits, with the discs of the second series preferably staggered with relation to those of the first and the discs of the second and third series at distances apart corresponding to the diameter of the biscuits, with slight clearance, such arrangement being clearly shown in Fig. 2 of the drawings.

Thus as the biscuits are carried along on the conveyor $a$ they will be deflected by the series of rotating discs $d$ into definitely spaced rows or lines.

Behind the last series of discs $d$ and appropriately close thereto there is provided for each row a paddle or bucket cage wheel $e$ revolving in the same direction as the travel of the conveyor $a$ and comprising a central spindle $f$ suitably of angular section on which is mounted a number, say four, of equally spaced and forwardly extending curved or shaped radial blades or plates $g$ forming between them open ended buckets or chambers $g^1$ into which the rows of biscuits from the final discs are fed and carried round to be deposited on to a delivery table or board $h$ into troughs or guides $h^1$ thereon. This construction is shown on an enlarged scale in Figs. 3 and 4. The said paddles extend through slots $h^2$ in the abruptly inclined end $h^3$ of the delivery table, which end, it will be observed, is straight and not curved. The biscuits slide down said end by gravity and the paddles are so shaped and mounted that they will collect a number of biscuits from a row on the conveyor and transfer them to the table in substantially vertical position or on edge between the guides $h^1$ which latter are spaced at distances corresponding to that between the final discs so that they will thus receive the biscuits in rows. After the first biscuit has thus been transferred the others will follow in succession on edge, being forced along the guides $h^1$ as they are delivered by the next curved blade $g$ of the paddle $e$ and so on automatically, enabling the biscuits to be readily removed from the guides in stacked condition ready for packing. It will be seen from Fig. 3 that the curvature of the blades $g$ is such that they bear against the biscuits approximately at the centres of the latter so as to feed them horizontally forward from the incline or chute $h^3$ while maintaining their inclination. Moreover, it will also be noted that in the four-blade construction illustrated, the blades are formed in pairs, two successive blades being constituted by a single piece or strip of metal, the central portion of which is fastened to spindle $f$.

Any appropriate driving means may be used for the movable parts of the apparatus, for example from a common driving shaft $i$ the conveyor may be driven continuously by belt and pulley gear $i^1$ $i^2$.

The disc shafts may be driven from drive shaft $i$ by chain and sprocket gear $j^1$, $j^2$, $j^3$, $j^4$, $j^5$, $j^6$ and the paddle shaft $f$ through chain and sprocket gear $k$, $k^1$.

In the claims which follow the term "biscuits" is held to include any other articles of a similar nature.

What I claim as my invention and desire to secure by Letters Patent of the United States is:—

1. In apparatus for stacking biscuits, means for spacing the biscuits comprising a movable conveyor adapted to receive the biscuits in disarranged condition, and a plurality of series of discs extending across the path of the conveyor and rotatable in a direction opposed to the travel of the conveyor for arranging the biscuits in definite rows on said conveyor; the discs of the first series being spaced apart for a distance greater than the diameter of the biscuits, and the discs of the following series being spaced apart at distances substantially corresponding to said diameter.

2. In apparatus for stacking biscuits, the combination of an inclined chute for receiving the biscuits, the lower portion of said chute being slotted, and a rotatable paddle device for receiving the biscuits from the chute; said paddle device comprising a plurality of curved blades constituting between them open-ended chambers adapted to receive the biscuits, the curvature of the blades being such as to cause the blades, on rotation of the paddle device, to bear outwardly against the biscuits approximately at the centres of the latter and to feed them respectively horizontally forward from the chute while maintaining their inclination.

3. Stacking apparatus, according to claim 2, in which the blades of the paddle device are mounted on a spindle, the blades being arranged in pairs, each pair being constituted by the end portions of a single strip of metal, the central portion of the strip being fastened to the spindle.

In witness whereof I have signed this specification.

HEMMING ALARIK ELFVING.